US012529459B1

(12) United States Patent
Hou

(10) Patent No.: US 12,529,459 B1
(45) Date of Patent: Jan. 20, 2026

(54) LIGHT-EMITTING DEVICE FOR ROTATIONALLY DELIVERING LIQUID UPWARD

(71) Applicant: Shenzhen HaiXinWang Electronic Co., Ltd, Guangdong (CN)

(72) Inventor: Yongguo Hou, Guangdong (CN)

(73) Assignee: Shenzhen HaiXinWang Electronic Co., Ltd, Shenzhen (CN)

( * ) Notice: Subject to any disclaimer, the term of this patent is extended or adjusted under 35 U.S.C. 154(b) by 0 days.

(21) Appl. No.: 18/830,577

(22) Filed: Sep. 11, 2024

(30) Foreign Application Priority Data

Jul. 17, 2024 (CN) ......................... 202421698392.9

(51) Int. Cl.

| | |
|---|---|
| ***F21S 10/00*** | (2006.01) |
| ***F04D 3/00*** | (2006.01) |
| ***F04D 29/18*** | (2006.01) |
| ***F21S 4/20*** | (2016.01) |
| ***F21V 31/00*** | (2006.01) |
| ***F21W 121/00*** | (2006.01) |
| ***F21Y 103/10*** | (2016.01) |
| ***F21Y 115/10*** | (2016.01) |

(52) U.S. Cl.

CPC ............ *F21S 10/002* (2013.01); *F04D 3/005* (2013.01); *F04D 29/181* (2013.01); *F21S 4/20* (2016.01); *F21V 31/005* (2013.01); *F21W 2121/00* (2013.01); *F21Y 2103/10* (2016.08); *F21Y 2115/10* (2016.08)

(58) Field of Classification Search

CPC ........... F21S 10/002; F21S 4/20; F04D 3/005; F04D 29/181; F21V 31/005; F21W 2121/00; F21Y 2103/10; F21Y 2115/10

See application file for complete search history.

(56) References Cited

U.S. PATENT DOCUMENTS

| | | | | |
|---|---|---|---|---|
| 5,678,918 A * | 10/1997 | Lin | F21S 8/00 | 40/406 |
| 5,913,595 A * | 6/1999 | Lin | F21S 10/002 | 362/101 |
| 6,153,273 A * | 11/2000 | Lee Lin | F21S 10/002 | 40/406 |
| 6,241,359 B1 * | 6/2001 | Lin | F21S 10/002 | 40/406 |

(Continued)

FOREIGN PATENT DOCUMENTS

CN 209744136 U 12/2019

*Primary Examiner* — Tsion Tumebo

(57) ABSTRACT

The present application discloses a light-emitting device for rotationally delivering liquid upward, which comprises: a motor, a first magnetic part, an inner chassis, a chamber shell, a second magnetic part, a rotating module, and a light-emitting assembly. Due to the cooperation, the rotating wheel blades and the rotating column blades, the rotating wheel blades can firstly stir the water flow at the bottom of the liquid chamber in a large area and at high efficiency, and then the rotating column blades cooperate to rotate and deliver the water flow upward stably and continuously to the top of the liquid chamber, so that the entire interior of the chamber is always filled with spirally rising water flow. Therefore, the entire dynamic projection effect of the lamp is better, the atmosphere effect is stronger, and the user experience is better.

9 Claims, 7 Drawing Sheets

(56) References Cited

U.S. PATENT DOCUMENTS

| | | | | |
|---|---|---|---|---|
| 6,332,282 | B1 * | 12/2001 | Lin | A01K 63/003 40/406 |
| 6,523,287 | B1 * | 2/2003 | Lee | G09F 19/02 40/406 |
| 7,347,016 | B2 * | 3/2008 | Dane | G09F 19/08 40/406 |
| 9,453,626 | B2 * | 9/2016 | Ruiz Bonet | F21S 10/00 |
| 9,869,437 | B2 * | 1/2018 | Chien | F21S 10/002 |
| 11,530,789 | B2 * | 12/2022 | Xu | C02F 1/688 |
| 2002/0141179 | A1 * | 10/2002 | Yen | F21S 10/002 362/101 |
| 2010/0073921 | A1 * | 3/2010 | Zhou | F03G 6/00 362/192 |
| 2014/0119958 | A1 * | 5/2014 | Dane | F04D 29/648 417/321 |

* cited by examiner

LIGHT-EMITTING DEVICE FOR ROTATIONALLY DELIVERING LIQUID UPWARD

CROSS REFERENCE TO RELATED APPLICATIONS

The present application claims the benefit of Chinese Patent Application No. 202421698392.9 filed on Jul. 17, 2024, the contents of which are incorporated herein by reference in their entirety.

TECHNICAL FIELD

The present application relates to the field of art crafts, and in particular, to a light-emitting device for rotationally delivering liquid upward.

BACKGROUND

Light-emitting lamps that have a function of rotationally delivering liquid upward are often used for indoor atmosphere decoration, and are deeply loved by consumers because of colorful and varied light-emitting effects. The basic working principle of this light-emitting lamp is as follows: the lamp is provided with a liquid chamber, the chamber is filled with liquid and is internally provided with a light source and a rotating blade, and the rotating blade is driven by a motor to rotate, thereby driving the liquid in the chamber to rotate and rise spirally. The light penetrates through the liquid and the chamber to project various dynamic effects.

The light-emitting lamp product currently on the market is provided with a rotating blade whose a lower end can be rotatably mounted on a base, and a platform on an upper end of the rotating blade is used to mount various forms of decorative parts (such as pavilion-shaped, tree-shaped and other decorative parts). The prior art can refer to the Chinese Application with Publication No. CN209744136U entitled “NIGHT LIGHT WITH ROTATING LIQUID”. However, the existing product has the following defects: based on the design requirements, the product is sometimes set to be too high, it is not enough to achieve the effect of liquid rotation and upward delivery through relying solely on several fan-shaped rotating blades at the bottom of the chamber, and the liquid can often rotate in the lower part of the chamber; and the water flow disturbance at the upper part or top of the chamber is weak, and the spiral rise effect is insufficient, which will seriously affect the continuity and consistency of rotationally delivering liquid upward visually, and further affect the dynamic effect of light penetration projection, resulting in poor atmosphere effect of the lamp.

SUMMARY

To overcome the defects in the prior art, the present application aims to provide a light-emitting device for rotationally delivering liquid upward, which can solve the problems of insufficient water delivery effect at the top part and poor continuity and consistency of rotationally delivering liquid upward in the conventional similar light-emitting device.

The present application is implemented by the following technical solutions.

A light-emitting device for rotationally delivering liquid upward comprises: a motor; a first magnetic part connected to an output shaft of the motor; an inner chassis arranged above the first magnetic part; a chamber shell covered on the inner chassis to form a sealed liquid chamber; a second magnetic part rotatably mounted on the inner chassis, wherein the first magnetic part and the second magnetic part form a magnetic coupling device; a rotating module that rotates following the second magnetic part and comprises: a rotating wheel and a rotating column, wherein a plurality of rotating wheel blades are distributed on an outer periphery of the rotating wheel, the rotating column is fixed on the rotating wheel, and continuous spiral rotating column blades are wound on an outer side wall of the rotating column; and a light-emitting assembly internally provided with a light source.

Further, the rotating column blades are continuous spiral blades, or discontinuous spiral blades, or a plurality of single blades arranged along an axial direction of the rotating column.

Further, a limiting groove is formed on a top of the chamber shell, and an annular mounting groove is formed on the rotating wheel; and a top end of the rotating column is rotatably sleeved in the limiting groove of the chamber shell, and a bottom end of the rotating column is arranged in the annular mounting groove of the rotating wheel, so that the rotating column is limited in a radial direction.

Further, a plurality of spherical protrusions are arranged at a bottom of the second magnetic part, and the spherical protrusions abut against a surface of the inner chassis.

Further, upper and lower opposite surfaces of the first magnetic part and the second magnetic part are magnetically repulsive.

Further, the light-emitting assembly further comprises: an isolation column and a lamp cap; the isolation column is a hollow sleeve, the light source is arranged in the isolation column and is a strip-shaped light strip provided with a plurality of LED lamp beads; and the lamp cap is fixedly connected to or integrally formed at a top end of the isolation column, and a bottom end of the isolation column is hermetically fixed on the inner chassis, so that an independent sealed space is formed inside the isolation column to isolate the liquid from entering.

Further, a plurality of magnetic blocks are distributed on the second magnetic part along an outer peripheral direction, and the plurality of rotating wheel blades are distributed on the outer periphery of the rotating wheel; and the magnetic blocks and the rotating wheel blades are distributed at intervals.

Further, a plurality of notches are uniformly provided on a bottom end of the rotating wheel along the outer peripheral direction, and the notches are connected to the inside of the rotating wheel.

Further, a blade surface of the rotating wheel blade comprises: a vertical surface and a circular arc surface; the vertical surface is upright relative to the inner chassis, the circular arc surface is inclined relative to the inner chassis, and the vertical surface and the circular arc surface are integrally and smoothly connected with each other.

Further, a plurality of through holes are uniformly distributed on the rotating column.

Compared with the prior art, the present application can achieve the following technical effects:

During operation, the motor is started to drive the first magnetic part to rotate, and the first magnetic part and the second magnetic part form the magnetic coupling device, so that the second magnetic part synchronously rotates under the action of magnetic force and drives the rotating module to rotate. The liquid is stirred by the rotating wheel blades around the rotating wheel and then is rotationally delivered upward, the rotating wheel blades mainly stir and spirally raise the liquid at the bottom of the liquid chamber, and meanwhile the liquid in the middle and the upper part of the liquid chamber can be driven to rise spirally and stably by the rotating column blades on the rotating column. The light emitted from the light source penetrates through the spirally rising liquid and is projected out of the lamp to achieve a dynamic illumination effect.

When the light-emitting device is too high, due to the cooperation of the rotating wheel blades and the rotating column blades, the rotating wheel blades can firstly stir the water flow at the bottom of the liquid chamber in a large area and at high efficiency, and then the rotating column blades cooperate to rotate and deliver the water flow upward stably and continuously to the top of the liquid chamber, so that the entire interior of the chamber is always filled with spirally rising water flow. Therefore, the entire dynamic projection effect of the lamp is better, the atmosphere effect is stronger, and the user experience is better.

Figure 1:
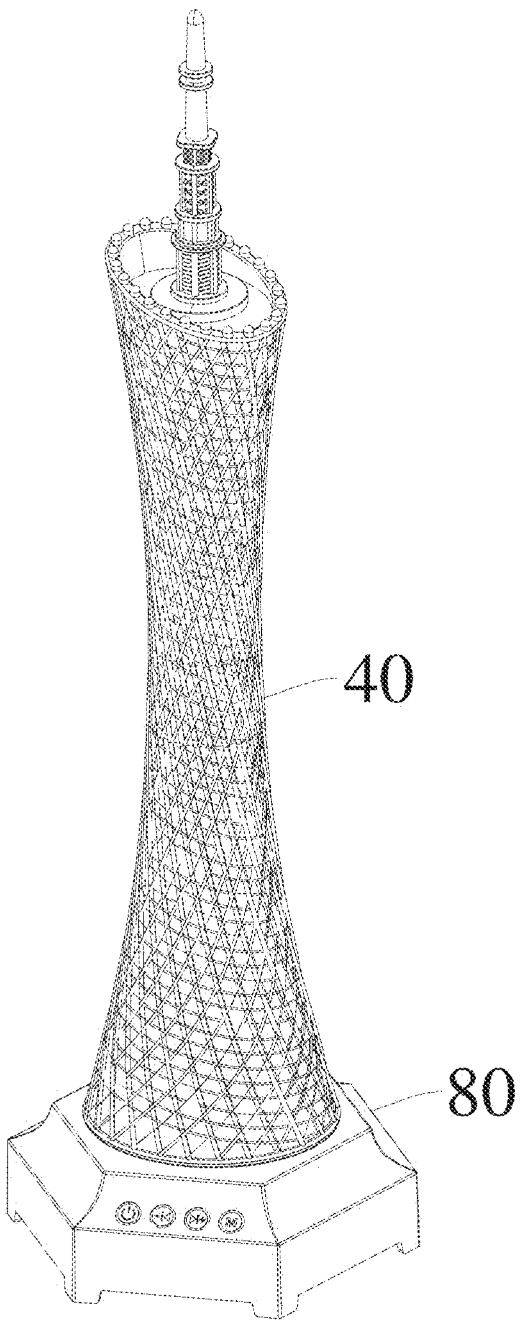
FIG. 1 is a schematic diagram of an appearance according to the present application.

In the drawings, 10: motor; 20: first magnetic part; 30: inner chassis; 40: chamber shell; 41: limiting groove; 50: second magnetic part; 51: spherical protrusion; 52: magnetic block mounting groove; 60: rotating module; 61: rotating wheel; 611: rotating wheel blade; 612: notch; 613: annular mounting groove; 62: rotating column; 621: rotating column blade; 622: through hole; 70: light-emitting assembly; 71: light source; 72: isolation column; 73: lamp cap; 80: mounting box; 90: power supply; 100: circuit board; and 110: sound box.

DETAILED DESCRIPTION OF EMBODIMENTS

The present application is further described below in conjunction with the accompanying drawings and specific implementations. It should be noted that, under the premise of no conflict, the various embodiments or technical features described below can be arbitrarily combined to form a new embodiment.

In the description of the present application, it should be noted that the directions or positional relationships indicated by terms such as "center", "length", "width", "thickness", "upper", "lower", "front", "rear", "left", "right", "vertical", "horizontal", "top", "bottom", "inner", "outer" and the like are those shown based on the accompanying drawings, which are merely intended to facilitate and simplify description of the present application rather than indicate or imply that the indicated device or element must have a specific direction and be structured and operated according to the specific direction, and should not be construed as limiting the present application.

Furthermore, the terms "first" and "second" are merely intended for a purpose of description, and shall not be understood as an indication or implication of relative importance or an implicit indication of a quantity of indicated technical features. Therefore, a feature defined with "first" or "second" may explicitly or implicitly include one or more features. In the description of the present application, "a plurality of" means two or more unless specifically limited otherwise.

In descriptions of the present application, it should be noted that unless otherwise expressly specified and limited, terms "mount", "interconnect", and "connect" should be understood in a broad sense. For example, such terms may indicate a fixed connection, a detachable connection, or an integral connection; may indicate a mechanical connection or an electrical connection; and may indicate a direct interconnection, an indirect interconnection through an intermediate medium, or an internal connection between two elements or an interaction between two elements. Those of ordinary skill in the art may understand specific meanings of the foregoing terms in the present application according to specific cases.

The present application discloses a light-emitting device for rotationally delivering liquid upward, which is particularly applicable to the field of art crafts.

Referring to FIGS. 1 to 5, the device comprises: a motor 10, a first magnetic part 20, an inner chassis 30, a chamber shell 40, a second magnetic part 50, a rotating module 60, and a light-emitting assembly 70. The motor 10 is used to output torque, the first magnetic part 20 is connected to an output shaft of the motor 10, the inner chassis 30 is arranged above the first magnetic part 20, and the chamber shell 40 is covered on the inner chassis 30 to form a sealed liquid chamber, wherein the liquid chamber is filled with liquid. Certainly, it may be understood that, by designing the chamber shell 40 into different shapes, the device can have different appearances. The second magnetic part 50 is rotatably mounted on the top surface of the inner chassis 30, and a gap is formed between the first magnetic part 20 and the second magnetic part 50, which together form a magnetic coupling device. Referring to FIGS. 6 to 7, the rotating module 60 is fixed to the second magnetic part 50 and comprises a rotating wheel 61 and a rotating column 62; a plurality of rotating wheel blades 611 are distributed on an outer periphery of the rotating wheel 61; and the rotating column 62 is fixed on the rotating wheel 61, and rotating column blades 621 are provided on an outer side wall of the rotating column 62. The light-emitting assembly 70 is internally provided with a light source 71. In this embodiment, the light source 71 is a strip-shaped light strip provided with LED lamp beads.

The shape and the spacing of the rotating column blades 621 are not limited. In this embodiment, the rotating column blades 621 are continuous spiral blades, which are beneficial to stable and spiral upward delivery of water flow. In other embodiments, the rotating column blades 621 may also be discontinuous spiral blades, and certainly, a single blade like the rotating wheel blade 611 may also be applicable, and the single blade may be regularly or irregularly arranged along the axial direction of the rotating column 62, for example, m single blades are arranged in a circle at intervals of n millimeters, and the structural form of the single blade is not limited.

When the present application is in operation, the motor 10 is started to drive the first magnetic part 20 to rotate, and the first magnetic part 20 and the second magnetic part 50 form the magnetic coupling device, so that the second magnetic part 50 synchronously rotates under the action of magnetic force and drives the rotating module 60 to rotate. The liquid is stirred by the rotating wheel blades 611 around the rotating wheel 61 and then is rotationally delivered upward, the rotating wheel blades mainly stir and spirally raise the liquid at the bottom of the liquid chamber, and meanwhile the liquid in the middle and the upper part of the liquid chamber can be driven to rise spirally and stably by the rotating column blades 621 on the rotating column 62 which are in a continuous spiral shape. The light emitted from the light source 71 penetrates through the spirally rising liquid and is projected out of the lamp to achieve a dynamic illumination effect.

When the light-emitting device is too high, due to the cooperation of the rotating wheel blades 611 and the rotating column blades 621, the rotating wheel blades 611 can firstly stir the water flow at the bottom of the liquid chamber in a large area and at high efficiency, and then the rotating column blades 621 cooperate to rotate and deliver the water flow upward stably and continuously to the top of the liquid chamber, so that the entire interior of the chamber is always filled with spirally rising water flow. Therefore, the entire dynamic projection effect of the lamp is better, the atmosphere effect is stronger, and the user experience is better.

Figure 2:
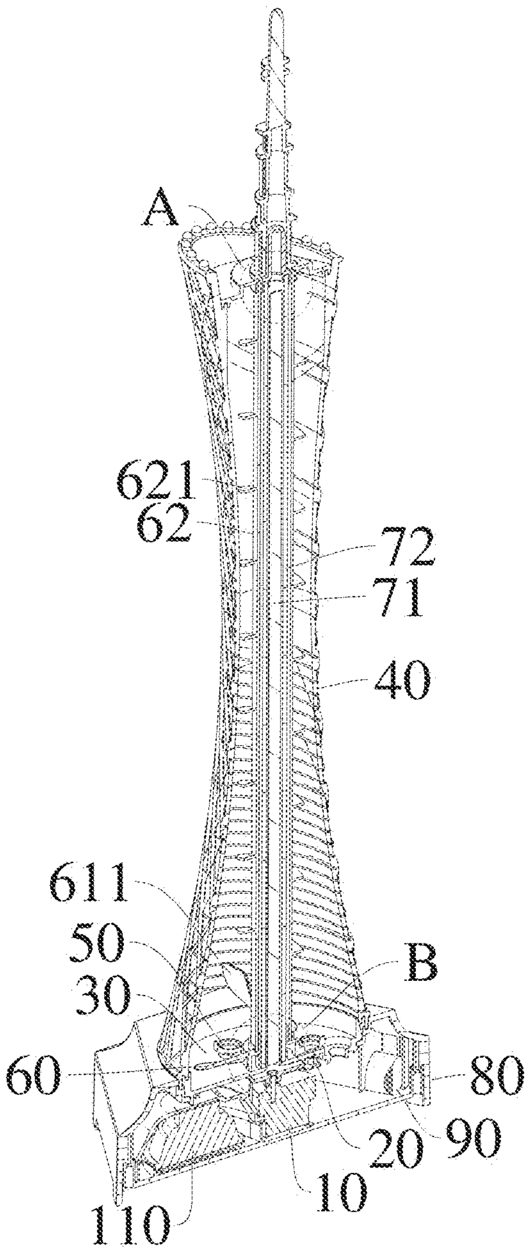
FIG. 2 is a cross-sectional view of FIG. 1.
Figure 3:
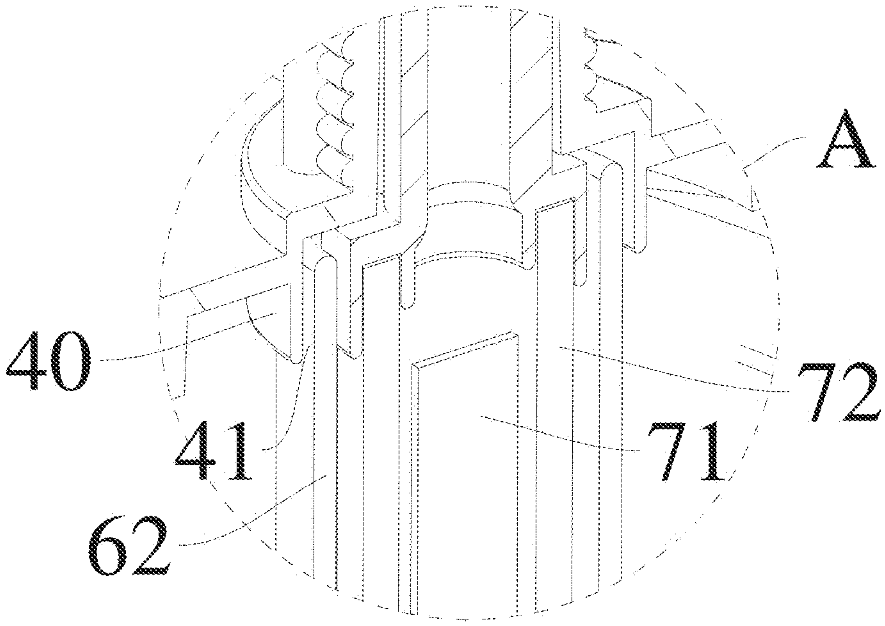
FIG. 3 is a partially enlarged view of A in FIG. 2.
Figure 4:
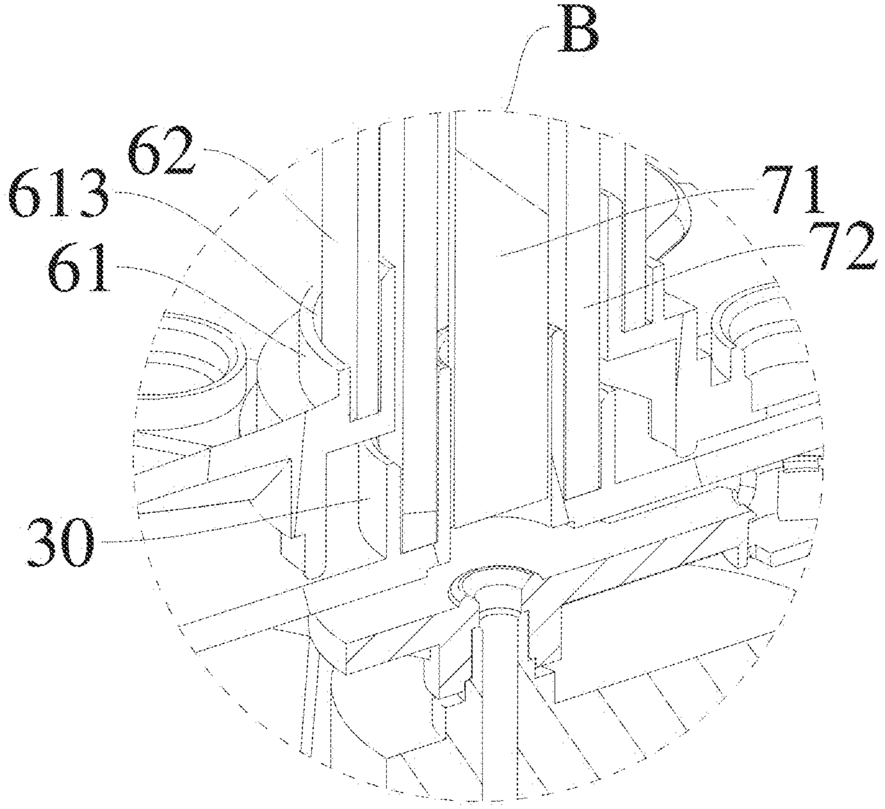
FIG. 4 is a partially enlarged view of B in FIG. 2.

Referring to FIGS. 2 to 4, a limiting groove 41 is formed on a top of the chamber shell 40, and an annular mounting groove 613 is formed on the rotating wheel 61; and a top end of the rotating column 62 is rotatably sleeved in the limiting groove 41 of the chamber shell 40, and a bottom end of the rotating column 62 is arranged in the annular mounting groove 613 of the rotating wheel 61, so that the rotating column 62 is limited in a radial direction.

In this way, when the rotating module 60 rotates, two ends of the rotating column 62 are not shaken forward and backward or left and right, especially the top of the rotating column 62 is not prone to deflection, which will make the spiral upward delivery of the liquid in the chamber more stable, that is, the stirring effect of the water flow is more regular; and the projection effect of light after penetrating through the water flow is better, which improves the atmosphere effect created by the lamp. Meanwhile, since the rotation is more stable, the resistance of the rotating module 60 to the water flow is also reduced, and the power consumption of the motor 10 is reduced.

Figure 9:
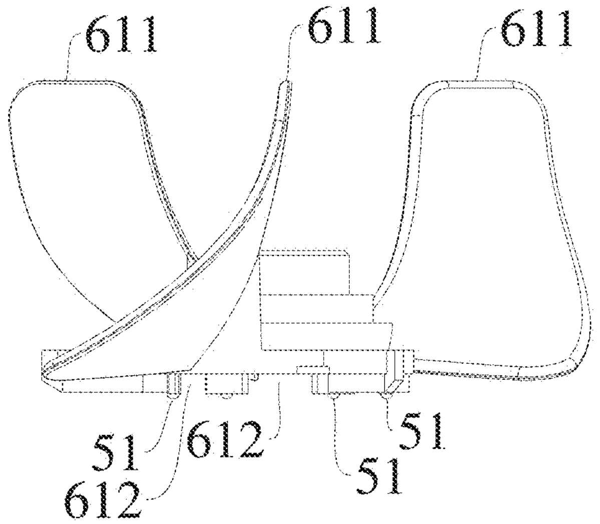
FIG. 9 is a front view of FIG. 8.

Preferably, referring to FIG. 9, a plurality of spherical protrusions 51 are arranged at a bottom of the second magnetic part 50, and the spherical protrusions 51 abut against a surface of the inner chassis 30. In this way, the contact area between the second magnetic part 50 and the inner chassis 30 can be minimized, thereby reducing the frictional resistance generated by the contact and making the rotation of the rotating wheel 61 smoother.

Preferably, the first magnetic part 20 and the second magnetic part 50 are both provided with magnetic blocks, and the opposite surfaces of the upper and lower magnetic blocks are magnetically repulsive, so that the rotation resistance can be reduced. Certainly, the opposing surfaces of the magnetic blocks of the first magnetic part 20 and the second magnetic part 50 may be magnetically attracted; however, when the two magnetic blocks are attracted, a higher rotation resistance is brought to the rotating module 60, so the magnetic repulsion manner is preferably used.

Figure 5:
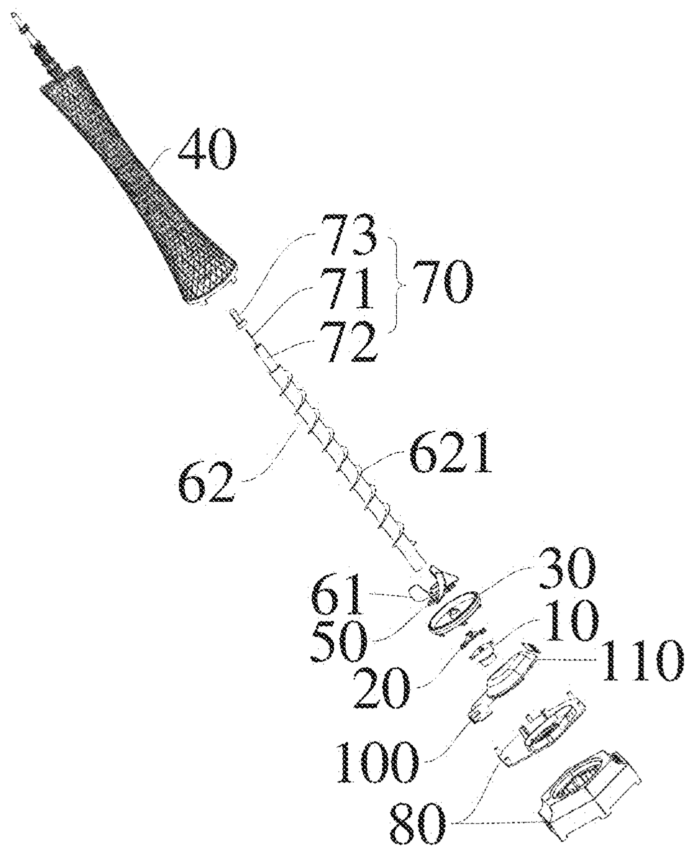
FIG. 5 is a schematic exploded view of the present application.
Figure 6:
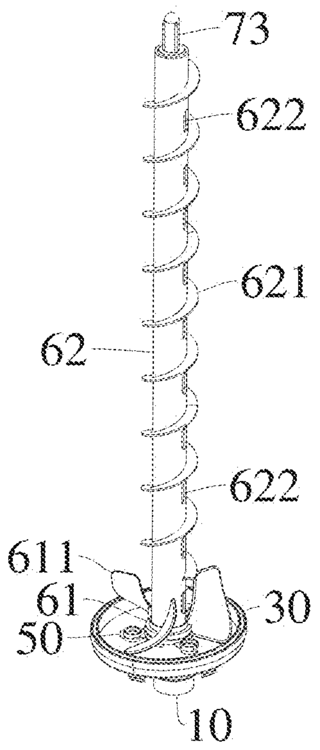
FIG. 6 is a schematic diagram showing the assembly of a rotating module.
Figure 7:
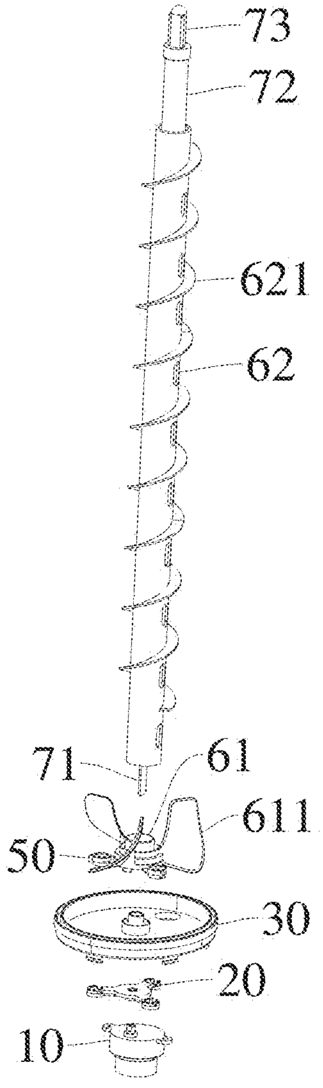
FIG. 7 is a schematic exploded view of a rotating module.

Preferably, referring to FIGS. 5 to 7, the light-emitting assembly 70 further comprises an isolation column 72 and a lamp cap 73. The isolation column 72 is a hollow sleeve, and the light source 71 is arranged in the isolation column 72. The lamp cap 73 is fixedly connected to or integrally formed at a top end of the isolation column 72, and a bottom end of the isolation column 72 is hermetically fixed on the inner chassis 30, so that an independent sealed space is formed inside the isolation column 72 to isolate the liquid from entering, and therefore the liquid and the light source 71 are isolated, and the lamp strip is prevented from being damaged.

Figure 8:
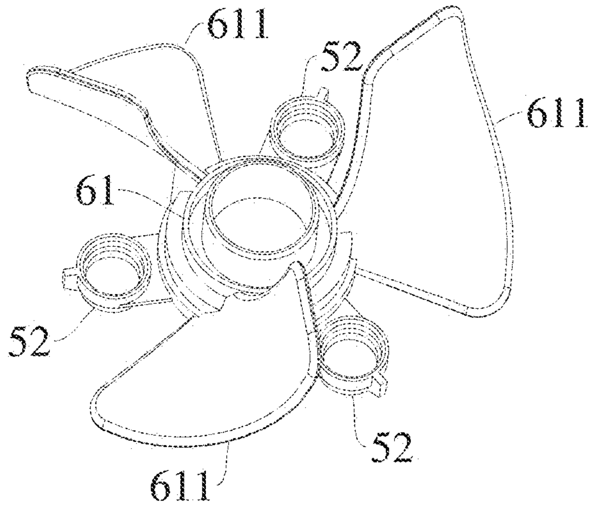
FIG. 8 is a schematic diagram of a rotating wheel and a second magnetic part.

Preferably, referring to FIG. 8, a plurality of magnetic blocks are distributed on the second magnetic part 50 along an outer peripheral direction, and the plurality of rotating wheel blades 611 are distributed on the outer periphery of the rotating wheel 61; and the magnetic blocks and the rotating wheel blades 611 are distributed at intervals, so that the liquid is better delivered upward.

Preferably, referring to FIGS. 8 and 9, the blade surface structure of the rotating wheel blade 611 may be specifically classified into a vertical surface and a circular arc surface; the vertical surface is upright relative to the inner chassis 30, the circular arc surface is inclined relative to the inner chassis 30, and the vertical surface and the circular arc surface are integrally and smoothly combined. This blade structure is beneficial to stirring larger area of water flow, so that the spiral rising effect of the water flow is better and the speed is higher.

To enhance the atmosphere effect, the liquid in the chamber is also mixed with particles such as glitter powder, which deposits to the bottom due to the gravity, and when the rotating wheel 61 rotates, the deposited glitter powder is easy to get stuck at the bottom of the rotating wheel 61, which affects the movement of the rotating wheel 61. Based on this, referring to FIG. 9, preferably, a plurality of notches 612 are uniformly provided on a bottom end of the rotating wheel 61 along the outer peripheral direction, and the notches 612 are connected to the inside of the rotating wheel 61. In this way, when the rotating wheel 61 rotates, the design of the notch 612 can provide a clearance between the rotating wheel 61 and the glitter powder depositing to the bottom, thereby preventing the glitter powder from getting stuck in the rotating wheel 61 and affecting the rotation.

Preferably, referring to FIG. 8, a plurality of magnetic block mounting grooves 52 are distributed on the second magnetic part 50 along the outer peripheral direction, and the magnetic blocks are hermetically mounted in the magnetic block mounting grooves 52, so that the magnetic block mounting grooves 52 can be sealed by sealing glue, and the magnetic block is not easy to fall off and rust.

Preferably, referring to FIG. 6, a plurality of through holes 622 are further provided on the rotating column 62, so that the liquid can be rapidly filled in the space formed between the rotating column 62 and the isolation column 72, thereby improving the production efficiency.

Preferably, referring to FIG. 2, the device further comprises a mounting box 80, the chassis covers the top of the mounting box 80, the mounting box and the chassis form a chamber for accommodating electrical elements, and the motor 10 and the first magnetic part 20 are both mounted in the chamber.

Preferably, the device further comprises a power supply 90, a circuit board 100 and a sound box 110, wherein the sound box 110 is arranged in the chamber of the mounting box 80. When the liquid is rotationally delivered upward and the lamp emits light, the music matched with rhythm can be played in conjunction with the sound box 110, so that the overall rhythm of the device is stronger, and the use experience of a user is improved.

The above embodiments are only preferred embodiments of the present application, and the scope of the present application should not be limited thereby. Any insubstantial changes and substitutions made by those skilled in the art based on the present application fall within the protection scope of the present application.

The invention claimed is:

1. A light-emitting device for rotationally delivering liquid upward, comprising:

a motor;

a first magnetic part connected to an output shaft of the motor;

an inner chassis arranged above the first magnetic part;

a chamber shell covered on the inner chassis to form a sealed liquid chamber;

a second magnetic part rotatably mounted on the inner chassis, wherein the first magnetic part and the second magnetic part form a magnetic coupling device;

a rotating module rotating following the second magnetic part, and comprising: a rotating wheel and a rotating column, wherein a plurality of rotating wheel blades are distributed on an outer periphery of the rotating wheel, the rotating column is fixed on the rotating wheel, and continuous spiral rotating column blades are wound on an outer side wall of the rotating column; and a light-emitting assembly internally provided with a light source;

wherein a blade surface of the rotating wheel blade comprises: a vertical surface and a circular arc surface; the vertical surface is upright relative to the inner chassis, the circular arc surface is inclined relative to the inner chassis, and the vertical surface and the circular arc surface are integrally and smoothly connected.

2. The light-emitting device for rotationally delivering liquid upward according to claim 1, wherein the rotating column blades are continuous spiral blades, or discontinuous spiral blades, or a plurality of single blades arranged along an axial direction of the rotating column.

3. The light-emitting device for rotationally delivering liquid upward according to claim 1, wherein a limiting groove is formed on a top of the chamber shell, and an annular mounting groove is formed on the rotating wheel; and a top end of the rotating column is rotatably sleeved in the limiting groove of the chamber shell, and a bottom end of the rotating column is arranged in the annular mounting groove of the rotating wheel, so that the rotating column is limited in a radial direction.

4. The light-emitting device for rotationally delivering liquid upward according to claim 1, wherein a plurality of spherical protrusions are arranged at a bottom of the second magnetic part, and the spherical protrusions abut against a surface of the inner chassis.

5. The light-emitting device for rotationally delivering liquid upward according to claim 1, wherein upper and lower opposite surfaces of the first magnetic part and the second magnetic part are magnetically repulsive.

6. The light-emitting device for rotationally delivering liquid upward according to claim 1, wherein the light-emitting assembly further comprises: an isolation column and a lamp cap; the isolation column is a hollow sleeve, the light source is arranged in the isolation column and is a strip-shaped light strip provided with a plurality of LED lamp beads; and the lamp cap is fixedly connected to or integrally formed at a top end of the isolation column, and a bottom end of the isolation column is hermetically fixed on the inner chassis, so that an independent sealed space is formed inside the isolation column to isolate the liquid from entering.

7. The light-emitting device for rotationally delivering liquid upward according to claim 1, wherein a plurality of magnetic blocks are distributed on the second magnetic part along an outer peripheral direction, and the plurality of rotating wheel blades are distributed on the outer periphery of the rotating wheel; and the magnetic blocks and the rotating wheel blades are distributed at intervals.

8. The light-emitting device for rotationally delivering liquid upward according to claim 1, wherein a plurality of notches are uniformly provided on a bottom end of the rotating wheel along the outer peripheral direction, and the notches are connected to the inside of the rotating wheel.

9. The light-emitting device for rotationally delivering liquid upward according to claim 1, wherein a plurality of through holes are uniformly distributed on the rotating column.

* * * * *